(12) United States Patent
Kobayashi

(10) Patent No.: US 8,041,927 B2
(45) Date of Patent: Oct. 18, 2011

(54) PROCESSOR APPARATUS AND METHOD OF PROCESSING MULTIPLE DATA BY SINGLE INSTRUCTIONS

(75) Inventor: Yusuke Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 374 days.

(21) Appl. No.: 12/385,406

(22) Filed: Apr. 7, 2009

(65) Prior Publication Data

US 2009/0265529 A1 Oct. 22, 2009

(30) Foreign Application Priority Data

Apr. 16, 2008 (JP) ................................. 2008-107061
Aug. 25, 2008 (JP) ................................. 2008-215137

(51) Int. Cl.
*G06F 7/38* (2006.01)
(52) U.S. Cl. ........................... 712/221; 712/22; 712/225
(58) Field of Classification Search .................... 712/22, 712/221, 225
See application file for complete search history.

(56) References Cited

U.S. PATENT DOCUMENTS

| 3,846,025 | A | * | 11/1974 | Wilber ........................... 356/459 |
|---|---|---|---|---|
| 4,028,506 | A | * | 6/1977 | Araseki et al. ................... 327/69 |
| 5,377,135 | A | * | 12/1994 | Kuroiwa ......................... 708/656 |
| 5,425,114 | A | * | 6/1995 | Hamasaki et al. ............. 382/254 |
| 5,917,857 | A | * | 6/1999 | Tanaka et al. .................. 375/253 |
| 6,671,797 | B1 | * | 12/2003 | Golston ........................... 712/224 |
| 6,687,299 | B2 | * | 2/2004 | Yoshida et al. ........... 375/240.16 |
| 6,859,499 | B2 | * | 2/2005 | Hashimoto ............... 375/240.27 |
| 7,174,047 | B2 | * | 2/2007 | Lin et al. ........................ 382/250 |
| 7,281,117 | B2 | * | 10/2007 | Tanaka et al. .................... 712/24 |
| 7,349,464 | B2 | * | 3/2008 | Kimura .......................... 375/152 |
| 7,424,501 | B2 | * | 9/2008 | Macy, Jr. ......................... 708/300 |
| 7,539,714 | B2 | * | 5/2009 | Macy et al. ..................... 708/200 |
| 7,724,261 | B2 | * | 5/2010 | Thekkath et al. .............. 345/522 |
| 2003/0031257 | A1 | * | 2/2003 | Yoshida et al. ........... 375/240.16 |
| 2003/0167460 | A1 | * | 9/2003 | Desai et al. ..................... 717/151 |
| 2004/0068642 | A1 | * | 4/2004 | Tanaka et al. .................. 712/223 |
| 2004/0078556 | A1 | * | 4/2004 | Spracklen ....................... 712/223 |
| 2004/0267856 | A1 | * | 12/2004 | Macy, Jr. ......................... 708/524 |
| 2004/0267858 | A1 | * | 12/2004 | Macy et al. ..................... 708/524 |
| 2005/0027969 | A1 | * | 2/2005 | Simon et al. ................... 712/225 |

(Continued)

FOREIGN PATENT DOCUMENTS

JP 7-60430 6/1995

(Continued)

OTHER PUBLICATIONS

Biswas, Prasenjit; Hasegawa, Atsushi; Mandaville, Srinivas; Debbage, Mark; Sturges, Andy; Arakawa, Fumio; Saito, Yasuhiko; and Uchiyama, Kunio, "SH-5: The 64-bit SuperH Architecture", © 2000, IEEE, pp. 28-39.*

Cho, Junho; Chang, Hoseoh; and Sung, Wonyong, "An FPGA Based SIMD Processor With A Vector Memory Unit", © 2006, IEEE, ISCAS, pp. 525-528.*

(Continued)

*Primary Examiner* — Aimee Li

(74) *Attorney, Agent, or Firm* — McGinn IP Law Group, PLLC

(57) ABSTRACT

A processor (and method) of processing multiple data by a single instruction includes first and second register sets each of which includes a plurality of registers, and an arithmetic unit to rearrange data being registered in the first and second register sets according to a relative size of an absolute value of the data between the first and second register sets so that the relative size is defined before executing an instruction considering the relative size.

35 Claims, 11 Drawing Sheets

U.S. PATENT DOCUMENTS

| | | | |
|---|---|---|---|
| 2005/0069037 A1* | 3/2005 | Jiang | 375/240.16 |
| 2005/0210086 A1* | 9/2005 | Lutz et al. | 708/200 |
| 2005/0210095 A1* | 9/2005 | Lutz et al. | 708/700 |
| 2008/0022077 A1* | 1/2008 | Thekkath et al. | 712/222 |
| 2008/0307206 A1* | 12/2008 | Vaclavik et al. | 712/223 |

FOREIGN PATENT DOCUMENTS

| | | |
|---|---|---|
| JP | 8-202530 (A) | 8/1996 |
| JP | 2004-192405 | 7/2004 |
| JP | 2009-258980 (A) | 11/2009 |

OTHER PUBLICATIONS

Raman, Srinivas K.; Pentkovski, Vladimir; and Keshave, Jagannath, "Implementing Streaming SIMD Extensions on the Pentium III Processor", © 2000, IEEE, pp. 47-57.*

Japanese Office Action dated Jul. 28, 2010, with English translation.

Jonathan Richard Shewchuk, "Adaptive Precision Floating-Point Arithmitic and Fast Robust Geometric Predicates", School of Computer Science Carnegie Mellon University Pittsburgh, PA 15213, pp. 1-10.

* cited by examiner

PROCESSOR APPARATUS AND METHOD OF PROCESSING MULTIPLE DATA BY SINGLE INSTRUCTIONS

INCORPORATION BY REFERENCE

This application is based upon and claims the benefit of priority from Japanese Patent Application No. 2008-107061 which was filed on Apr. 16, 2008, and Japanese Patent Application No. 2008-215137 which was filed on Aug. 25, 2008, the disclosure of which is incorporated herein in its entirety by reference.

BACKGROUND OF THE INVENTION

1. Field of the Invention

The present invention relates to a Single Instruction Multiple Data (SIMD) arithmetic processor, apparatus and a method, an arithmetic processing unit and a compiler used for the SIMD arithmetic processor that obtain a calculation error by a floating-point operation.

2. Description of Related Art

As a high precision operating method using a double precision arithmetic processor, a "double-double" operation is known. The double-double operation is a floating-point type operation that uses two words of double precision type 64 bits. The operation achieves 106 bit accuracy by using two words for high (the MSB side) and low (the LSB side). "MSB" means the "Most Significant Bit", and "LSB" means the "Least Significant Bit".

Double-double addition is expressed by a formula below:

$(c.hi, c.lo)=(a.hi, a.lo)+(b.hi, b.lo)$ $a.hi+b.hi=fl(a.hi+b.hi)+err(a.hi+b.hi)=fl.hi+err.hi$ $a.lo+b.lo=fl(a.lo+b.lo)+err(a.lo+b.lo)=fl.lo+err.lo$ A fl (op(A)) means a normalized value of op(A), and an err (op(A)) means a computing error of op(A)).

In order to execute the double-double addition, a roundoff error of the double precision addition result is calculated. For calculating the roundoff error, Dekker's algorithm and Knuth's algorithm are known.

Knuth's algorithm includes six instructions below.

$x \leftarrow a+b$ $b_{virtual} \leftarrow x-a$ $a_{virtual} \leftarrow x-b_{virtual}$ $b_{roundoff} \leftarrow b-b_{virtual}$ $a_{roundoff} \leftarrow a-a_{virtual}$ $y \leftarrow a_{roundoff}+b_{roundoff}$ The computing error y is obtained from two inputs a and b, and "+" means addition and "−" means subtraction. Knuth's algorithm, however, has a drawback in that many operations are required for calculating the computing error.

On the other hand, Dekker's algorithm may be operated with three instructions as shown below.

$x \leftarrow a+b$ $b_{virtual} \leftarrow x-a$ $y \leftarrow b-b_{virtual}$

It is assumed that $|a| > |b|$ in Knuth's algorithm.

As such, Dekker's algorithm may have an advantage over Knuth's algorithm in that it has a smaller number of operations for calculating the computing error.

As a related art, a patent document 1 discloses a SIMD processor which includes a plurality of processor elements (PE) to process a plurality of data. Each of the processor elements (PE) of the SIMD processor of the patent document 1 includes a plurality of comparing elements and a plurality of arithmetic registers each of which is connected to each of the comparing elements. The comparing element compares a value of the arithmetic register and a single immediate. The immediate is a constant value which is included in a command being executed by the processor. When the command is fetched by the processor, the immediate is used immediately. The comparing element stores a result of a logic operation based on each of a result of the comparison to a condition register which is used for controlling whether an operation of each of the processor elements is executed or not.

A patent document 2 discloses a basic operation element of an SIMD-type parallel data operation apparatus.

[Non-Patent Document 1] Jonathan Richard Shewchuk, "Adaptive Precision Floating-Point Arithmetic and Fast Robust Geometric Predicates", School of Computer Science Carnegie Mellon University Pittsburgh, Pa. 15213

[Patent Document 1] Japanese Patent Laid-Open No. 2004-192405

[Patent Document 2] Japanese Patent Laid-Open No. Hei-7-060430

SUMMARY

According to one exemplary aspect of the present invention, a processor of processing multiple data by a single instruction includes first and second register sets each of which includes a plurality of registers, and an arithmetic unit to rearrange data being registered in the first and second register sets according to a relative size of an absolute value of the data between the first and second register sets so that the relative size is defined before executing an instruction considering the relative size.

According to another exemplary aspect of the present invention, a method of processing multiple data by a single instruction includes comparing an absolute value of data being registered in a first register set and an absolute value of data being registered in a second register set, and rearranging data being registered in the first and second register sets according to a relative size of an absolute value of the data between the first and second register sets so that the relative size is defined before executing an instruction considering the relative size.

According to another exemplary aspect of the present invention, a method of processing multiple data by an instruction includes performing the instruction, the instruction including comparing an absolute value of data being registered in a first register set and an absolute value of data being registered in a second register set, and an arithmetic unit to rearrange data being registered in the first and second register sets according to a relative size of an absolute value of the data between the first and second register sets so that the relative size is defined before executing an instruction considering the relative size.

According to another exemplary aspect of the present invention, a method of processing a multiple data by an instruction includes compiling the instruction, the instruction including comparing an absolute value of data being registered in a first register set and an absolute value of data being registered in a second register set; and an arithmetic unit to rearrange data being registered in the first and second register sets according to a relative size of an absolute value of the data between the first and second register sets so that the relative size is defined before executing an instruction considering the relative size.

BRIEF DESCRIPTION OF THE DRAWINGS

Other exemplary aspects and advantages of the invention will be made more apparent by the following detailed description and the accompanying drawings, wherein.

DETAILED DESCRIPTION OF THE EXEMPLARY EMBODIMENT

As disclosed in non-patent document 1, Dekker's algorithm may have an advantage over Knuth's algorithm in that it has a smaller number of operations for calculating the computing error. However, whether the absolute value of "a" is larger than the absolute value of "b" or not, is required to be apparent before the double precision addition operation. The "a" and "b" are variables for calculating the computing error of the double precision addition operation. In Dekker's algorithm, a conditional determination process (i.e., whether the absolute value of "a" is larger than the absolute value of "b" or not) is executed in a related art, and the operation for calculating the computing error is executed based on the comparison result. The conditional determination process may stall an instruction pipeline in the CPU. In the double precision addition executed in the SIMD processor like the vector arithmetic operation, it is required to check a consistency in each of corresponding registers of two register sets. Therefore, in the related art, it is not appropriate to operate the double precision addition operation by Dekker's method.

The patent documents 1 and 2 do not disclose comparing the absolute values between two variables, which is a step used in the double precision addition operation.

Embodiments of the present invention will be described below with reference to the drawings. The embodiments show the present invention applied to an arithmetic processing unit that obtains the computing error by operations in a Single Instruction Multiple Data (SIMD) technique that executes a plurality of operations by one instruction. The embodiments include an SIMD instruction execution unit for calculating the computing error of a floating-point addition, which is standardized by IEEE 754, by a smaller number of execution steps than that of the related art.

1. First Exemplary Embodiment

Figure 1:
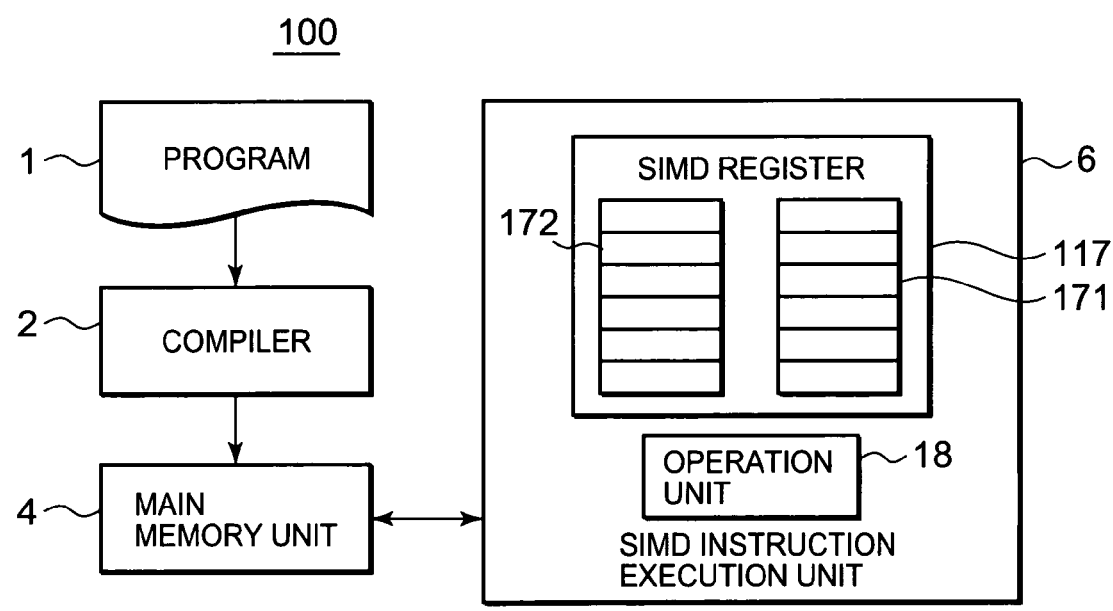
FIG. 1 is an example of a diagram showing an arithmetic processing unit 100 of the present invention.

FIG. 1 is an example of a diagram showing an arithmetic processing unit 100 according to a first exemplary embodiment. As shown in FIG. 1, the arithmetic processing unit 100 includes a compiler (translator) 2 for compiling a program 1, a main memory unit 4 for storing a plurality of instructions which are generated by the compiler 2, and a Single Instruction Multiple Data (SIMD) instruction execution unit 6. The program 1 may be for calculating the computing error. The SIMD instruction execution unit 6 may calculate the computing error by executing a plurality of operations by one instruction which is read out from the main memory unit 4.

The SIMD instruction execution unit 6 includes an operation unit 18 which compares an absolute value of data being registered in a first register set 171 and an absolute value of data being registered in a second register set 172. In other words, the operation unit 18 compares the absolute values of two input data from the first register set 171 and the second register set 172, each of which includes a plurality of registers. The operation unit 18 compares the absolute values according to the SIMD technique. The operation unit 18 determines the input data having a bigger absolute value as a "first value" and the input data having a smaller absolute value as a "second value". The operation unit 18 executes an arithmetic operation, such as an addition and subtraction, by using the first value and the second value according to the SIMD technique.

In the arithmetic processing unit 100, the program (program code) 1, which is for calculating the computing error for example, is loaded to the compiler 2 and transformed into an instruction format available for the SIMD instruction execution unit 6. The result of compiling is stored in the main memory unit 4. The main memory unit 4 sends out an instruction in response to a request from the SIMD instruction execution unit 6. The SIMD instruction execution unit 6 may request an input of data to the main memory unit 4, and executes the comparison of the absolute values, the addition or subtraction processing according to the SIMD technique. The SIMD instruction execution unit 6 may output the operation result to the main memory unit 4.

In the first exemplary embodiment, the operation unit 18 compares the absolute value of the data being registered in the first register set 171 and the absolute value of the data being registered in the second register set 172, and sorts the compared data into the first value and the second value. For example, the first value may be sorted by a larger absolute value and the second value may be sorted by a smaller absolute value. The relative size (e.g., large or small) of the absolute value of the first and second values is already determined before calculating the computing error. Therefore, the computing error of the double precision addition may be calculated by the SIMD operation according to Dekker's algorithm.

2. Second Exemplary Embodiment

Figure 2:
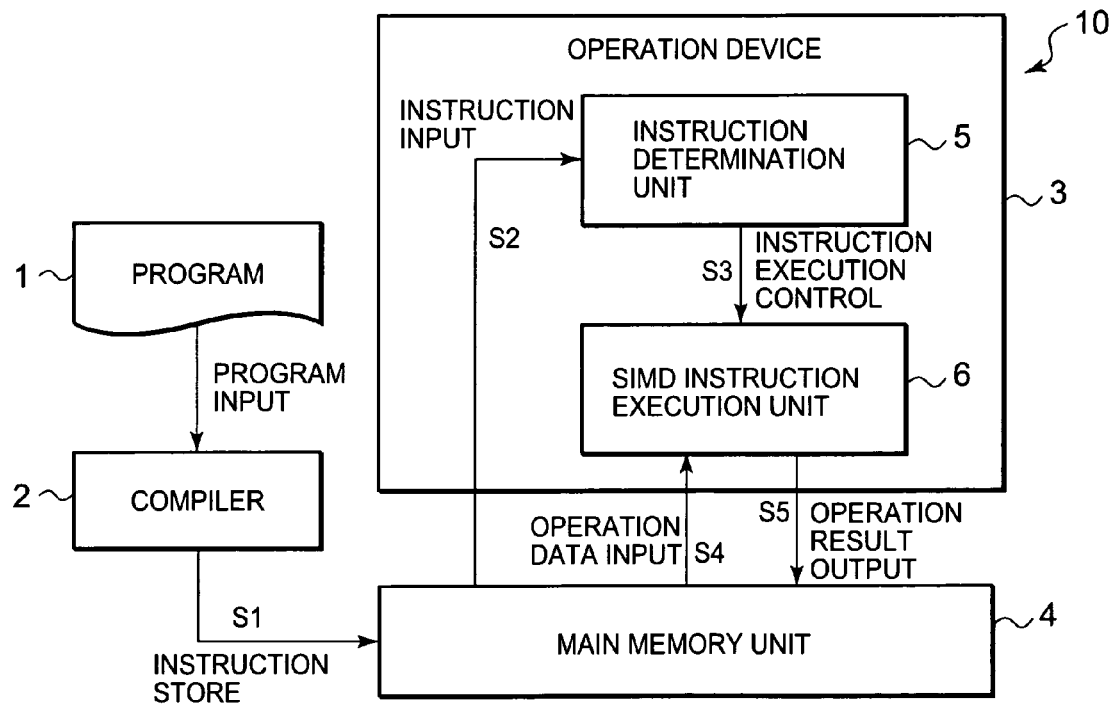
FIG. 2 is an example of a diagram showing an arithmetic processing unit 10 of the present invention.

A second exemplary embodiment of the present invention will be described. FIG. 2 is an example of a diagram showing the arithmetic processing unit 10. As shown in FIG. 2, the arithmetic processing unit 10 includes the compiler 2 to which the program 1 is input, the operation unit 3, and the main memory unit 4. The operation unit 3 includes an instruction determination unit 5, and the SIMD instruction execution unit 6 which executes an arithmetic operation according to the SIMD technique. The SIMD instruction may calculate the computing error.

In the arithmetic processing unit 10, the program 1, which may be used for calculating the computing error, is loaded to the compiler 2 and compiled into the instruction format. The compiled instruction is stored in the main memory unit 4 (INSTRUCTION STORE S1). The main memory unit 4 sends out an instruction to the instruction determination unit 5 of the operation unit 3 in response to a request from the operation unit 3 (INSTRUCTION INPUT S2). The instruction determination unit 5 controls an instruction execution of the SIMD instruction execution unit 6 (INSTRUCTION EXECUTION CONTROL S3).

The SIMD instruction execution unit 6 may request an input of data from the main memory unit 4. After receiving the data from the main memory unit (OPERATION DATA INPUT S4), the SIMD instruction execution unit 6 executes the instruction directed by the instruction which is issued by the instruction determination unit 5 according to the "EXECUTION CONTROL S3". The SIMD instruction execution unit 6 may send out an operation result to the main memory unit 4 (OPERATION RESULT OUTPUT S5).

Figure 3:
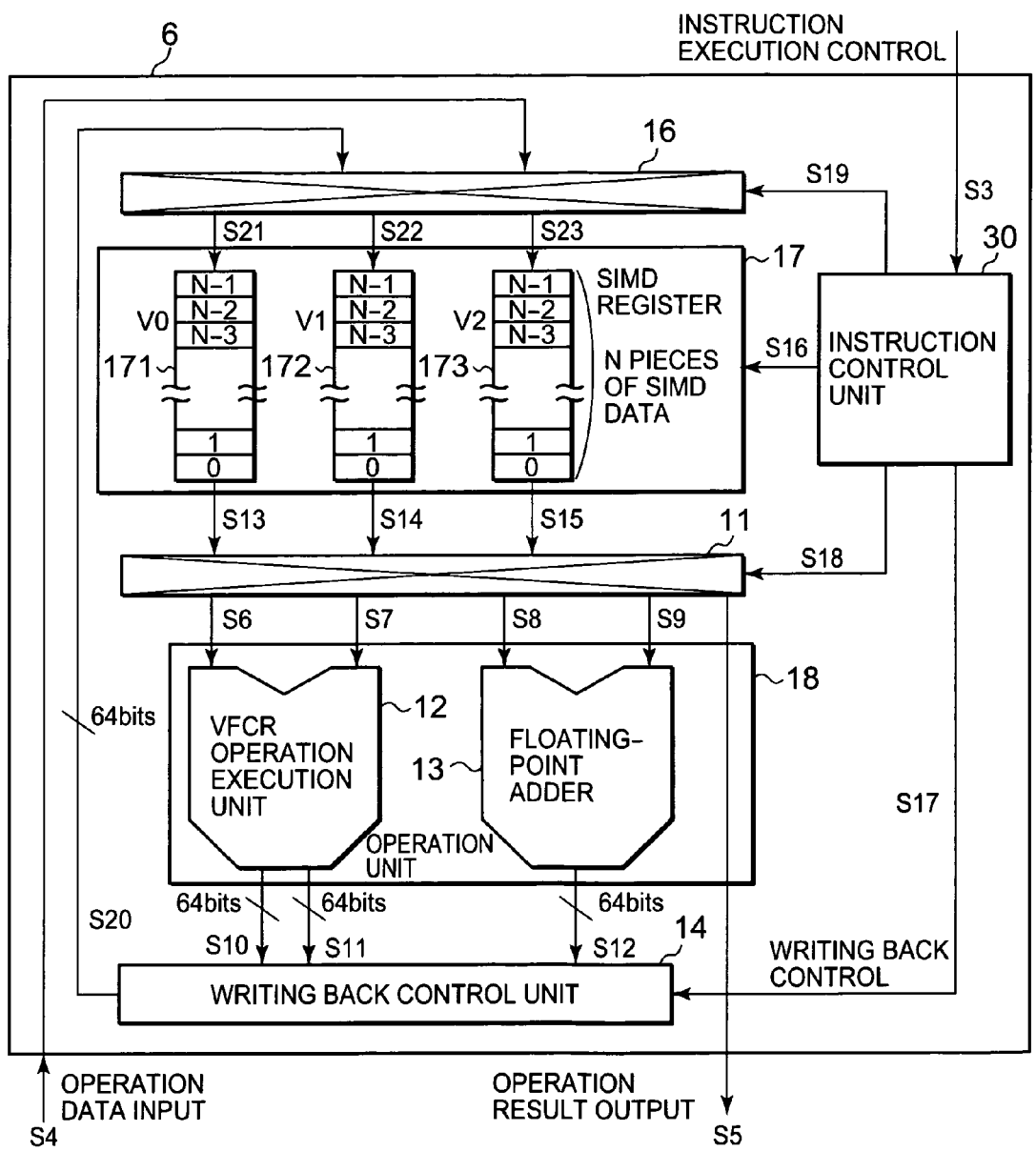
FIG. 3 is an example of a diagram showing an SIMD instruction execution unit 6 of the present invention.

FIG. 3 is an example of a diagram showing the SIMD instruction execution unit 6. As shown in FIG. 3, the SIMD instruction execution unit 6 includes a register input unit crossbar 16, an SIMD register 17, a register output unit crossbar 11, an operation unit 18, a writing back control unit 14 and an instruction control unit 30. The SIMD register 17 includes the first register set 171 which includes a plurality of registers (register numbers 0, 1, . . . , N-2, N-1) for storing V0, the second register set 172 which includes a plurality of registers (register numbers 0, 1, . . . , N-2, N-1) for storing V1 and a third register set 173 which includes a plurality of registers (register numbers 0, 1, . . . , N-2, N-1) for storing V2. The SIMD register 17 may be used for the SIMD operation in the second exemplary embodiment. The SIMD register 17 also may be used as a register for another purpose.

The operation unit 18 includes a VFCR (Vector Floating Compare to Return values) operation execution unit 12 to compare the absolute values of the data registered in the V0 and V1, and a floating-point adder 13 to execute an addition arithmetic operation. The operation unit 18 executes operations in the SIMD technique. The SIMD instruction execution unit 6 is adapted to execute floating-point operations defined by IEEE 754 (i.e., IEEE binary-coded floating-point operation standard) specification for calculating the computing error in the result of the double precision addition.

The instructions which may be executed by the SIMD instruction execution unit 6 will be described below. A sequence of the instructions is shown below.

VFCR V0, V1: (V0($i$), V1($i$))←(V0($i$), V1($i$))
VFAD V2, V0, V1: V2($i$)←V0($i$)+V1($i$)
VFSB V2, V2, V0: V2($i$)←V2($i$)−V0($i$)
VFSB V2, V1, V2: V2($i$)←V1($i$)−V2($i$)

In response to VFCR, the absolute values of two pieces of data (V0, V1) are compared, and the piece of data having a relatively larger absolute value is determined as V0($i$) (i.e., the first value), and the piece of data having a relatively smaller absolute value is determined as V1($i$) (i.e., the second value). The VFAD adds the first value V0($i$) and the second value V0($i$). The VFSB subtracts the first value V0($i$) from the above-described result of addition V2($i$). Then, the VFSB subtracts the above-described result of subtraction V2($i$) from the second value V1($i$). The computing error of the addition arithmetic operation is obtained according to the four instructions.

The VFCR operation execution unit 12 compares the absolute values of two input data which are inputted from the first register set 171 and the second register set 172, and outputs the input data having the larger absolute value as the first value V0($i$), and the input data having the smaller absolute value as the second value V1($i$). In other words, the two input data are interchangeably returned to the first and second register sets.

The register input unit crossbar 16 inputs the operation result from the operation unit 18 to the SIMD register 17.

The SIMD register 17 includes the third register set 173 for storing the operation result from the floating-point adder 13 in addition to the first register set 171 for storing the first value V0($i$) and the second register set 172 for storing the second value V1($i$).

The register output unit crossbar 11 outputs data which is sent from the SIMD register 17 to the operation unit 18. The register input unit crossbar 16 and the register output unit crossbar 11 may be crossbar switches. Each crossbar includes switches at intersections of a plurality of communication channels vertically disposed in a substantially parallel arrangement, and a plurality of communication channels substantially horizontally disposed in the same manner as the communication channels above and adapted to dynamically establish a proprietary route through the crossing communication channels by controlling the set of the switches.

The floating-point adder 13 executes addition and subtraction by using the first value V0($i$), the second value V1($i$), and the operation result V2($i$) which is sent from the operation unit 18. In other words, the floating-point adder 13 executes the operations directed by the above-described instructions VFAD and VFSB. The floating-point adder 13 adds the first value V0($i$) and the second value V1($i$), subtracts the first value V0($i$) from the addition result V2($i$), and subtracts the subtraction result V2($i$) from the second value V1($i$).

The writing back control unit 14 outputs data which is sent from the operation unit 18 to the register input unit crossbar 16 as 64-bit data. The VFCR operation execution unit 12 outputs 128 bits data having 64 bits of the first value V0($i$) and 64 bits of the second value V1($i$). The second value V1($i$) may be stored in a buffer, the writing back control unit 14 outputs the first value V0($i$) to the register input unit crossbar 16 at first, and then sends out the second value V1($i$) to the register input unit crossbar 16 at the next timing for reducing the number of wirings between the operation unit 18 and the SIMD register 17. Although the writing back control unit 14 is installed in the second exemplary embodiment, the writing back control unit 14 may be omitted in such a case where a distance between the VFCR operation execution unit 12 and the register input unit crossbar 16 is close.

The instruction control unit 30 controls the register input unit crossbar 16 to input the first value V0($i$) to the first register set 171 and the second value V1($i$) to the second register set 172. In other words, the instruction control unit 30 controls so that the register set which registers the data having larger absolute value and the register set which registers the data having smaller absolute value, are separated from each other.

The instruction control unit 30 controls the register input unit crossbar 16 to input the addition result or the subtraction result which is sent from the floating-point adder 13 to the third cluster of registers 173. The instruction control unit 30 controls the register output unit crossbar 11 to input the values which are outputted from the first, second or the third register set 171-173 to either the VFCR operation execution unit 12 or the floating-point adder 13.

The compiler 2 generates a first instruction which is for comparing the absolute values of data which are inputted from the first and second register set 171 and 172, is for registering the data having larger value to the first register 171 and for registering the data having smaller value to the second register 172. The compiler 2 generates a second instruction which is for adding the first value $V0(i)$ of the first register set 171 and the second value $V1(i)$ of the second register set 172, and for outputting the result of addition to the third register set 173.

The compiler 2 generates a third instruction which is for subtracting the first value $V0(i)$ from the result of addition which is inputted from the third register set 173 and for outputting the result of subtraction to the third register set 173. The compiler 2 generates a fourth instruction which is for subtracting the result of subtraction which is inputted from the third register set 173 from the second value $V1(i)$. The instructions are stored in the main memory unit 4 (S1 shown in FIG. 2), input to the instruction determination unit 5 (S2 shown in FIG. 2), and input to the instruction control unit 30 of the SIMD instruction execution unit 6 (S3 shown in FIG. 2).

Figure 4:
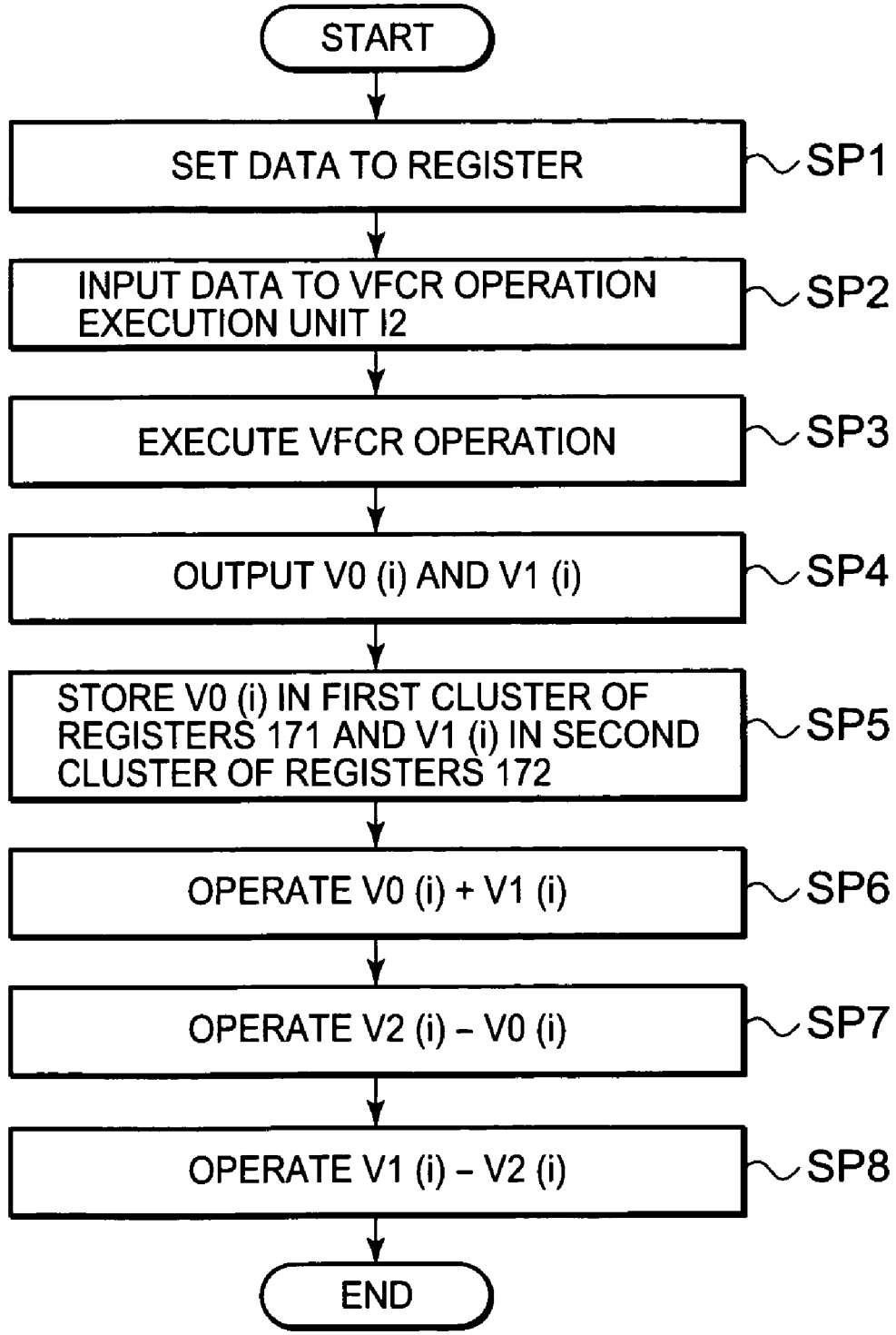
FIG. 4 is an example of a flowchart showing operations of the SIMD instruction execution unit 6.

An example of operations of the SIMD instruction execution unit will be described. FIG. 4 is an example of a flowchart for showing the operations of the SIMD instruction execution unit. When the instruction control unit 30 of the SIMD instruction execution unit 6 for executing the VFCR instruction receives a signal (INSTRUCTION EXECUTION CONTROL S3), the instruction control unit 30 sends out a signal (REGISTER CONTROL S16) to the SIMD register 17, a signal (WRITING BACK CONTROL S17) to the writing back control unit 14, a signal (OUTPUT UNIT CROSSBAR CONTROL S16) to the register output unit crossbar 11, and a signal (INPUT UNIT CROSSBAR CONTROL S19) to the register input unit crossbar 16.

When the SIMD register 17 receives the signal (S16), the SIMD register 17 sends out the values stored in the $0^{th}$ register of at least one of the register set among the register sets V0, V1 and V2. The SIMD register 17 outputs the data being registered in the $0^{th}$ register of V0 as a signal (V0 output S13) and outputs the data being registered in the $0^{th}$ register of V1 as a signal (V1 output S14). Subsequently, the data being registered in the $1^{st}$ register to the $N-1^{th}$ registers are outputted at every two cycles (step SP1). The two cycles are related with control on the buffer of the writing back control unit 14. If the values are sent out at every cycle, then the buffer may be run out (e.g., exhausted).

The register output unit crossbar 11 switches inputs which are toward the operation unit 18. When the register output unit crossbar 11 receives a signal (OUTPUT UNIT CROSSBAR CONTROL S18) from the instruction control unit 30, the register output unit crossbar 11 determines the register set number by the signal (S18) and switches the signal (S13) so as to be a signal (VFCR input S6), and switches the signal (S14) so as to be a signal (VFCR input S7) (step SP2).

When the VFCR operation execution unit 12 receives the signal (S6), the VFCR operation execution unit 12 executes the VFCR operation (step SP3) and outputs signals (S10, S11) to the writing back control unit 14.

The writing back control unit 14 controls a signal input toward the register input unit crossbar 16. When the writing back control unit 14 receives the signal (S17) from the instruction control unit 30, the writing back control unit 14 stores the signal (S11) in a 64-bit buffer and outputs the signal (S10) as a signal (operation result S20). The writing back control unit 14 outputs the signal (S11) which is stored in the 64-bit buffer as the signal (S20) at the cycle next to the cycle in which the signal (S10) is sent out as the signal (S20) (step SP4).

The register input unit crossbar 16 switches a destination of the input signals which are to be inputted to the SIMD register 17 (step SP5). When the register input unit crossbar 16 receives the signal (S19), the register input unit crossbar 16 selects a destination whether a signal (S21) or a signal (S22) according to the signal (S19), and outputs the signal (S20) to the register set V0 or V1 through the signal (S21) or the signal (S22). For example, the register input unit crossbar 16 outputs the first received 64-bit data via the signal (S20) to the first register set V0 via the signal (S21). Next, the register input unit crossbar 16 outputs the 64-bit data, which is received via the signal (S20) at a next cycle of the first received 64-bit data, to the second register set V1 via the signal (S22).

The SIMD register 17 stores the input data which is inputted via the signal (S21) or (S22) in the registers whose register number is the same as the register number of the output data for the VFCR operations. In other words, the output data which is outputted for the VFCR operation is returned to the register whose register number is the same as the output data. For example, the first received signal (S21) is stored in the $0^{th}$ register of register set V0, and the first received signal (S22) is stored in the $0^{th}$ register of register set V1. The V0 and V1 increment the numbers of the registers to store the signal (S21) and the signal (S22) by one each time when register sets V0 and V1 receive the signal (S21) and the signal (S22), respectively. The register set V0 and V1 store the signal (S21) and the signal (S22) in N registers, respectively. In other words, the signal (S21) is stored in from the $0^{th}$ register to $N^{th}$ register of register set V0 in receiving order, and the signal (S22) is stored in from $0^{th}$ to $N^{th}$ register of register set V1.

Subsequently, the signal (S13), the signal (S14) and a signal (V2 output S15) of the SIMD register 17 are inputted to the floating-point adder 13 as a signal (adder input S8) or a signal (adder input S9) for executing an addition arithmetic operation or subtraction arithmetic operation. First, the signal (S13) is inputted to the floating-point adder 13 as the signal (S8), and the signal (S14) is inputted to the floating-point adder 13 as the signal (S9). The floating-point adder 13 adds the data corresponding to the signal (S8) and the data corresponding to the signal (S9) (step SP6). The operation result is sent out from the floating-point adder 13 as a signal (adder output S12) to the register input unit crossbar 16 via the writing back control unit 14. Then, the operation result is inputted to register set V2 of the SIMD register 17 as the signal (S23).

Next, the signal (S15) is inputted to the floating-point adder 13 as the signal (S8) and the signal (S13) is inputted to the floating-point adder 13 as the signal (S9). The floating-point adder 13 subtracts the data corresponding to the signal (S13) from the data corresponding to the signal (S15) (step SP7). The operation result is sent out from the floating-point adder 13 as the signal (S12) to the register input unit crossbar 16 via the writing back control unit 14. Then, the operation result is inputted to the register set V2 of the SIMD register 17 as the signal (S23).

Next, the signal (S14) is input to the floating-point adder 13 as the signal (S8) and the signal (S15) is inputted to the floating-point adder 13 as the signal (S9). The floating-point adder 13 subtracts the data corresponding to the signal (S15) from the signal (S14) (step SP8). The operation result is sent out from the floating-point adder 13 as the signal (S12) to the register input unit crossbar 16 via the writing back control unit 14. Then, the operation result is inputted to the register set V2 of the SIMD register 17 as the signal (S23). According to the above mentioned operation, the computing error is calculated. The calculated computing error may be stored in the third register set 173, for example V2, and may be read out or be outputted to outside from the writing back control unit 14.

Figure 5:
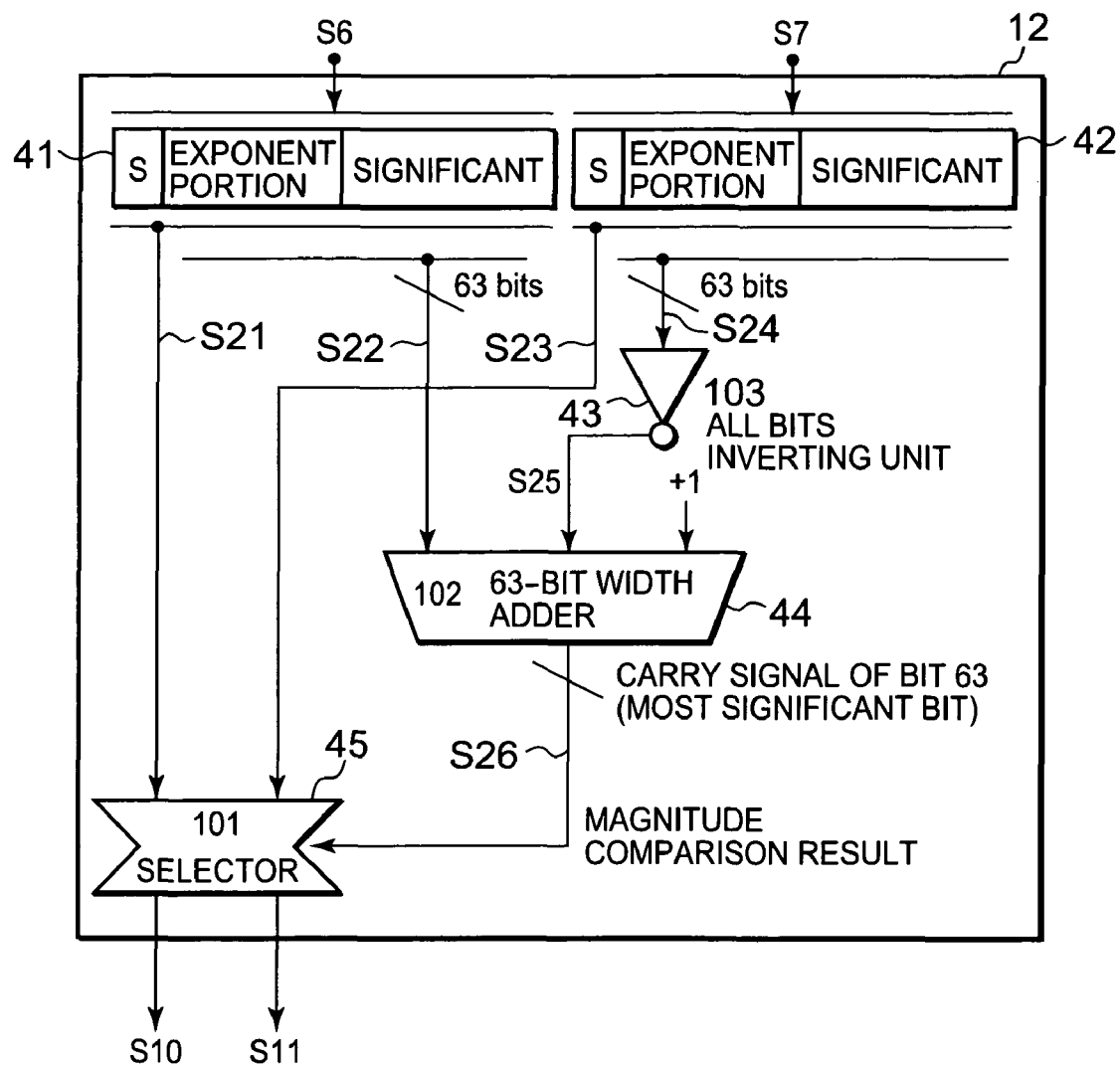
FIG. 5 is an example of a block diagram showing a VFCR operation execution unit of the present invention.

Now, the VFCR operation execution unit 12 will be described. FIG. 5 is an example of a block diagram showing the VFCR operation execution unit 12. The VFCR operation execution unit 12 includes buffers 41 and 42 to which the signals (S6 and S7) are inputted respectively, an inverter 43, an adder 44, and a selector 45.

The buffers 41 and 42 store a 64-bit data which includes a sign bit, a exponent portion and a significant (i.e., a mantissa). From the buffers 41 and 42, the 64-bit data is output to the selector 45 and 63-bit data of the 64-bit data (i.e., all bits except the sign bit) is input to the adder 44. The 63-bit data corresponding to the signal (S7), the 63-bit data including the exponent portion and the significant, is inputted to the inverter 43 and inverted by the inverter 43. By adding the inverted data corresponding to the signal (S7) and the other data corresponding to the signal (S6), the inverted data is subtracted from the other data.

The adder 44 may output "0" when the subtraction result is negative, and may output "1" when the subtraction result is positive. The selector 45 may output the first value V0 having larger absolute value as the signal (S10) and the second value V1 having smaller absolute value as the signal (S11). When the signal (S26) from the adder 44 is negative (i.e., the adder 44 outputs "0"), it is determined that the data corresponding to the signal (S7) has the larger absolute value. Thus, the selector 45 outputs the data corresponding to the signal (S7) as the signal (S10), and outputs the data corresponding to the signal (S6) as the signal (S11). When the signal (S26) is positive (i.e., the adder 44 outputs "1"), the selector 45 outputs the data corresponding to the signal (S6) as the signal (S10) and outputs the data corresponding to the signal (S7) as the signal (S11).

Now, an example of operations of the VFCR operation execution unit 12 will be described. When the VFCR operation execution unit 12 receives the signal (S6), the VFCR operation execution unit 12 inputs the 63-bit data corresponding to the signal (S6) (except the sign bit), to the adder 44 as the adder input. When the VFCR operation execution unit 12 receives the signal (S7), the VFCR operation execution unit 12 inverts all bits of the 63-bit data corresponding to the signal (S7) (except the sign bit), and inputs the inverted result to the adder 44 as the adder input.

The adder 44 includes three inputs. The adder 44 adds the data corresponding to the signal (S22), the data corresponding to the signal (S25), and a signal (+1), and then outputs the carry signal of the most significant bit (bit 63) to the selector 45 as an absolute value comparison result (i.e., signal S26). The signal (+1) may be for incrementing the data by 1.

When the absolute value comparison result (i.e., signal S26) is "1" (i.e., the absolute value of the data corresponding to the signal (S6)≧the absolute value of the data corresponding to the signal (S7)), the selector 45 outputs the data corresponding to the signal (S6) as the signal (S10), and outputs the data corresponding to the signal (S7) as the signal (S11).

When the absolute value comparison result (i.e., signal S26) is "0" (i.e., the absolute value of the data corresponding to the signal (S6)<the absolute value of the data corresponding to the signal (S7)), the selector 45 outputs the data corresponding to the signal (S6) as the signal (S11) and outputs the data corresponding to the signal (S7) as the signal (S10). Consequently, the data having a larger absolute value is outputted as the signal (S10).

Although the data width of the operated data is 64 bits in the above-described exemplary operations that adopt a double precision-type (binary 64) operation of the IEEE 754 floating-point data format, the operations of the present invention do not depend on that data width. The operations may be executed in other formats such as the short-type (binary 32) format.

Although the VFCR operation execution unit 12 is described separately from the floating-point adder 13, the VFCR operation execution unit 12 may be included as a function of the floating-point adder 13 by using the adder of the floating-point adder 13. Alternatively, the VFCR operation execution unit 12 may be included as a function of an arithmetic processor that includes a 64-bit adder such as a fixed-point adder and the ALU.

Although N pieces of data are processed by one arithmetic processor which includes the SIMD instruction execution unit in the above-described exemplary operations, the number of the arithmetic processor may be incremented to "M". In other words, in the present invention, the number of arithmetic processors is not limited to one arithmetic processor.

Further, although the present invention is described as a hardware configuration in the above-described embodiments, the present invention is not limited to be implemented by the hardware configuration, and may have a part of the processing implemented by a computer program running on a CPU (Central Processing Unit). In that case, the computer program may be distributed on recording media or delivered via transmission media including the Internet.

Further, it is noted that Applicant's intent is to encompass equivalents of all claim elements, even if amended later during prosecution.

3. Third Exemplary Embodiment

Figure 6:
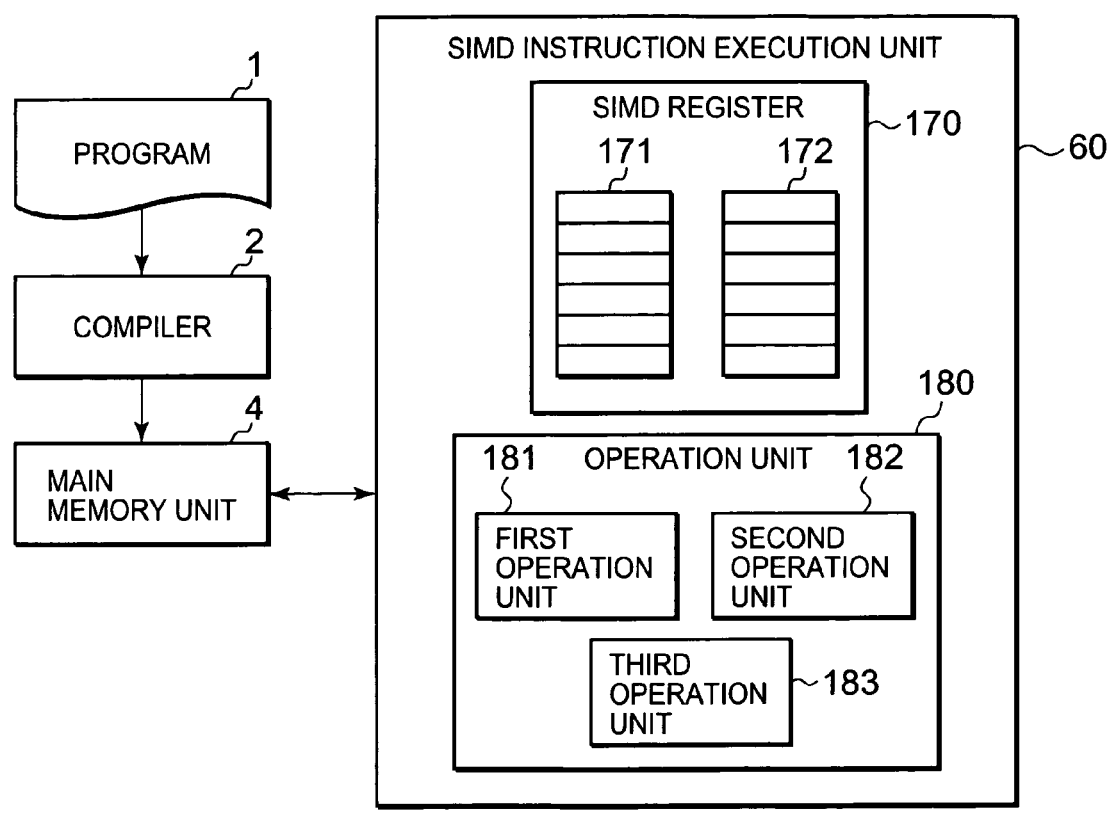
FIG. 6 is an example of a diagram showing another arithmetic processing unit 60 of the present invention.

FIG. 6 is an example of a diagram showing an arithmetic processing unit 1000 according to a third exemplary embodiment. As shown in FIG. 6, the arithmetic processing unit 1000 includes the compiler (translator) 2 for compiling a program 1, the main memory unit 4 for storing a plurality of instructions which are generated by the compiler 2, and the Single Instruction Multiple Data (SIMD) instruction execution unit 60.

The SIMD instruction execution unit 60 includes an SIMD register 170 and an operation unit 180. The SIMD register 170 includes the first register set 171 and the second register set 172, each of which includes a plurality of registers. The operation unit 180 includes a first operation unit 181, a second operation unit 182, and a third operation unit 183.

The operation unit 180 operates two input values being inputted from the first register set 171 and the second register set 172 according to the SIMD technique. The first operation unit 181 and the second operation unit 182 compare the absolute values between the two input values. The first operation unit 181 determines the input data having a bigger absolute value as the "first value", or determines the input data as the "first value" when the two input data have an equal absolute value. The first operation unit 181 outputs the first value to the first register set 171.

The first operation unit 182 determines the input data having a smaller absolute value as the "second value", or determines the input data as the "second value" when the two input data have an equal absolute value. The second operation unit 182 outputs the second value to the second register set 172.

The third operation unit 183 operates the arithmetic operation, such as an addition and subtraction, by using the first value and the second value according to the SIMD technique.

The relative size (e.g., large or small) of the absolute value of the first and second values is already determined before calculating the computing error. In other words, the input data having the larger absolute value are gathered in the first register set 171, and the input data having the smaller absolute value are gathered in the second register set 172. Therefore, the computing error of the double precision addition may be calculated by the SIMD operation according to Dekker's algorithm.

In this embodiment, the operation unit 181 operates prior to the operation unit 182. However, the present invention is not limited to this sequence.

4. Fourth Exemplary Embodiment

Figure 7:
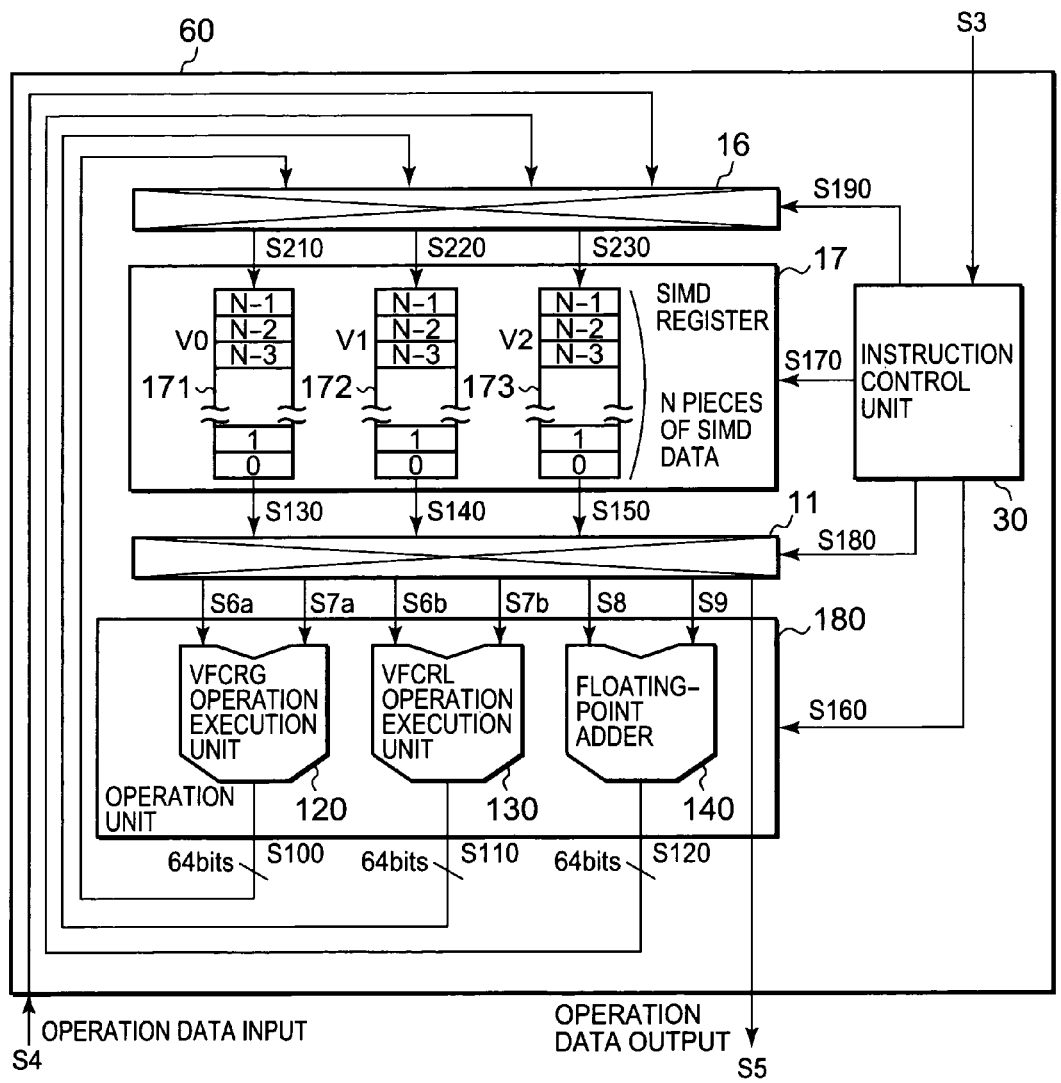
FIG. 7 is an example of a diagram showing an SIMD instruction execution unit 60 of the present invention.

As shown in FIG. 7, the SIMD instruction execution unit 60 includes the register input unit crossbar 16, the SIMD register 17, the register output unit crossbar 11, the operation unit 180 and the instruction control unit 30.

An instruction which is executed by the SIMD instruction execution unit 60 is shown below.

VFCRG V2, V0, V1: $V2(i) \leftarrow (V0(i), V1(i))$
VFCRG V0, V0, V1: $V0(i) \leftarrow (V0(i), V1(i))$
VFAD V1, V0, V2: $V1(i) \leftarrow V0(i) + V2(i)$
VFSB V2, V1, V2: $V2(i) \leftarrow V1(i) - V2(i)$
VFSB V2, V0, V2: $V2(i) \leftarrow V0(i) - V2(i)$ In response to VFCRG, the absolute values of two pieces of data ($V0(i)$, $V1(i)$) are compared, and the piece of data having a larger absolute value is outputted to $V2(i)$. When two pieces of data ($V0(i)$, $V1(i)$) have an equal value with each other, $V0(i)$ is outputted to $V2(i)$. In response to VFCRL, the absolute values of two pieces of data ($V0(i)$, $V1(i)$) are compared, and the piece of data having a smaller absolute value is outputted to $V0(i)$. When two pieces of data ($V0(i)$, $V1(i)$) have an equal value with each other, $V1(i)$ is outputted to $V2(i)$. The VFAD adds the $V0(i)$ and the $V2(i)$. The VFSB subtracts the $V2(i)$ from the $V1(i)$. Then, the VFSB subtracts the $V2(i)$ from the $V0(i)$. The computing error of the addition arithmetic operation is obtained according to the five instructions.

The SIMD register 17 includes the first register set 171 which includes a plurality of registers (register numbers 0, 1, ..., N-2, N-1) for storing V0, the second register set 172 which includes a plurality of registers (register numbers 0, 1, ..., N-2, N-1) for storing V1 and a third register set 173 which includes a plurality of registers (register numbers 0, 1, ..., N-2, N-1) for storing V2. The SIMD register 17 may be used for the SIMD operation in the second exemplary embodiment. The SIMD register 17 also may be used as a register for another purpose.

The operation unit 180 includes a VFCRG (Vector Floating Compare to Return Greater values) operation execution unit 120, a VFCRL (Vector Floating Compare to Return Less values) operation execution unit 130 and a floating-point adder 140. The operation unit 180 executes operations in the SIMD technique. The SIMD instruction execution unit 60 is adapted to execute floating-point operations defined by IEEE 754 (i.e., IEEE binary-coded floating-point operation standard) specification for calculating the computing error in the result of the double precision addition.

The VFCRG operation execution unit 120 compares the absolute values between the two input data being inputted from the first register set 171 and the second register set 172. The VFCRG operation execution unit 120 outputs the larger absolute value data as $V2(i)$ (i.e., the first value). The VFCRG operation execution unit 120 outputs the first value to the register input unit crossbar 16. When the absolute value of the input data are equal, the VFCRG operation execution unit 120 outputs the input data being inputted from the first register set 171 as $V2(i)$ (i.e., the first value).

The VFCRL operation execution unit 130 compares the absolute values between the two input data being inputted from the first register set 171 and the second register set 172. The VFCRL operation execution unit 130 outputs the smaller absolute value data as $V0(i)$ (i.e., the second value). The VFCRL operation execution unit 130 outputs the second value to the register input unit crossbar 16. When the absolute value of the input data are equal, the VFCRL operation execution unit 130 outputs the input data being inputted from the second register set 172 as $V0(i)$ (i.e., the first value).

The floating-point adder 140 executes addition and subtraction by using the $V0(i)$, the $V1(i)$ and the $V2(i)$. In other words, the floating-point adder 140 executes the operations directed by the above-described instructions VFAD and VFSB. The floating-point adder 140 adds the $V0(i)$ and the $V2(i)$, subtracts the $V2(i)$ from the addition result $V1(i)$, and subtracts the subtraction result $V0(i)$ from the $V0(i)$.

The instruction control unit 30 controls the register input unit crossbar 16 to input the data being sent from the first register set 171 and the second register set 172 to the VFCRG operation execution unit 120 and the VFCRL operation execution unit 130. The instruction control unit 30 controls the register input unit crossbar 16 to input the data being sent from the first register set 171, the second register set 172 and the third register set 173 to the floating-point adder 140.

The compiler 2 generates a first instruction which is for comparing the absolute values of data which are inputted from the first and second register set 171 and 172, and is for registering the data having larger absolute value or equal absolute value to the third register 173.

The compiler 2 generates a second instruction which is for comparing the absolute values of data which are inputted from the first and second register set 171 and 172, and is for registering the data having smaller absolute value or equal absolute value to the first register 171.

The compiler 2 generates a third instruction which is for adding the first value $V2(i)$ of the third register set 173 and the second value $V0(i)$ of the first register set 171, and is for outputting the result of addition to the second register set 172.

The compiler 2 generates a fourth instruction which is for subtracting the first value $V2(i)$ from the result of addition which is inputted from the second register set 172, and is for outputting the result of subtraction to the third register set 173.

The compiler 2 generates a fifth instruction which is for subtracting the result of subtraction which is inputted from the third register set 173 from the second value $V0(i)$. The instructions are stored in the main memory unit 4 (S1 shown in FIG. 2), input to the instruction determination unit 5 (S2 shown in FIG. 2), and input to the instruction control unit 30 of the SIMD instruction execution unit 60 (S3 shown in FIG. 2).

Figure 8:
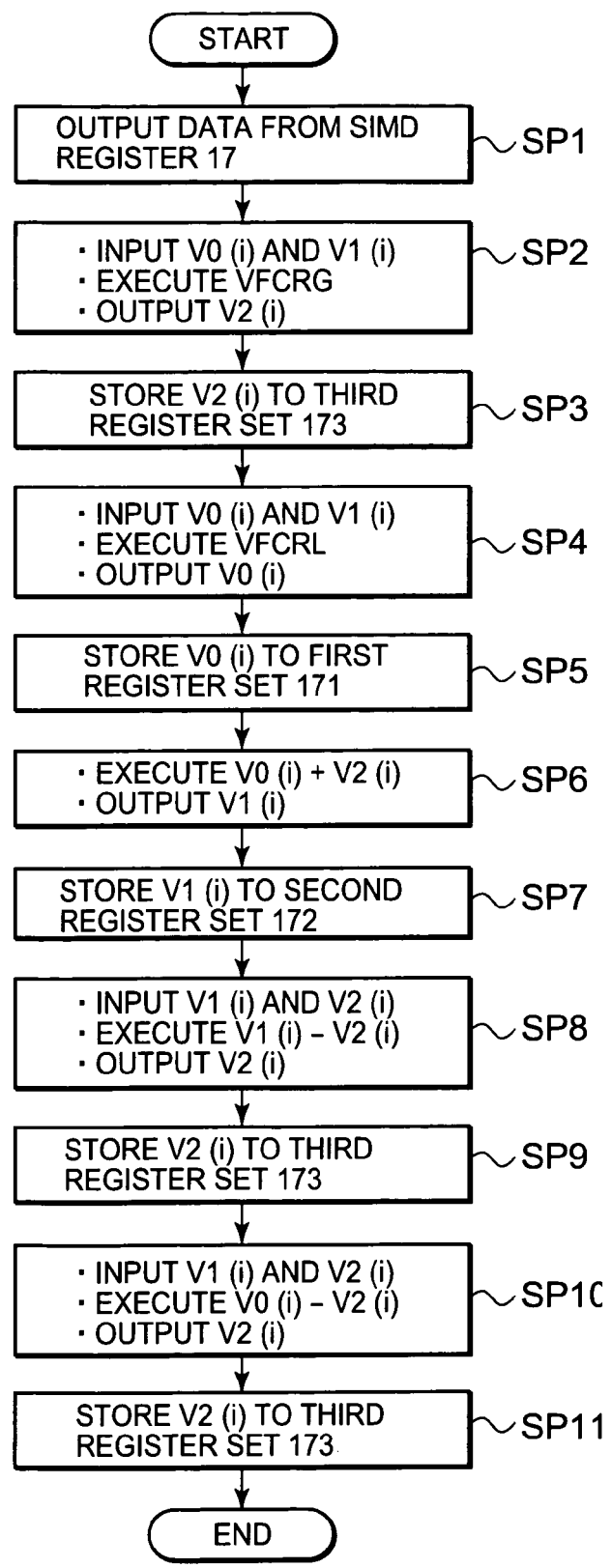
FIG. 8 is an example of a flowchart showing operations of the SIMD instruction execution unit 60.

An example of operations of the SIMD instruction execution unit 60 will be described as referring to FIG. 7 and FIG. 8. FIG. 8 is an example of a flowchart for showing the operations of the SIMD instruction execution unit 60. When the instruction control unit 30 of the SIMD instruction execution unit 60 receives a signal (INSTRUCTION EXECUTION CONTROL S3), the instruction control unit 30 sends out a signal (REGISTER CONTROL S170) to the SIMD register 17, a signal (OUTPUT UNIT CROSSBAR CONTROL S180) to the register output unit crossbar 11, a signal (INPUT UNIT CROSSBAR CONTROL S190) to the register input unit crossbar 16, and a signal (OPERATION UNIT CONTROL S160) to the operation unit 180.

When the SIMD register 17 receives the signal (S170), the SIMD register 17 sends out the values stored in the $0^{th}$ register of at least one of the register set among the register sets V0, V1 and V2.

The SIMD register 17 outputs the data being registered in the $0^{th}$ register of V0 as a signal (V0 output S130), outputs the data being registered in the $0^{th}$ register of V1 as a signal (V0 output S140), and outputs the data being registered in the $0^{th}$ register of V2 as a signal (V2 output S150). For example, the SIMD register 17 outputs a data being registered in the $0^{th}$ register of V0 as the signal (V0 output S130). Subsequently, the data being registered in the $1^{st}$ registers to the N-$1^{th}$ registers are outputted at every one cycle (step SP1).

The register output unit crossbar 11 switches inputs which are toward the operation unit 180. When the register output unit crossbar 11 receives the signal (S180) from the instruction control unit 30, the register output unit crossbar 11 determines the register set number by the signal (S180) and switches the signal (S130) so as to be a signal (VFCRG input S6a), and switches the signal (S140) so as to be a signal (VFCRL input S7a) (step SP2).

When receiving the signals (S6a and S7a), in other words when inputting the V0($i$) and V1($i$), the VFCRG operation execution unit 120 executes the VFCRG operation, and outputs a signal (VFCRG output S100) which is as to be the V2($i$) (Step SP2). The signal (S100) may be 64 bits data. The signal (S100) is inputted to the register input unit crossbar 16.

When receiving the "S100", the register input unit crossbar 16 switches a destination of the input signals which are to be inputted to the SIMD register 17. When the register input unit crossbar 16 receives the signal (S190), the register input unit crossbar 16 recognizes that a destination of data from the register input unit crossbar 16 is "S230".

When receiving "S100", the register input unit crossbar 16 switches a destination of the input signals which are to be inputted to the SIMD register 17, and inputs "S100" of the 64 bits data to "S230".

The SIMD register 17 stores the input data which is inputted via "S230" in the register of the register set V2. The register number of the register of the register set V2 is the same as the register number of the output data for the VFCRG operation. In other words, the SIMD register 17 stores V2($i$) to the third register set 173 (Step SP3). For example, the first received signal (S230) is stored in the $0^{th}$ register of the register set V2, and the second received signal (S230) is stored in the $1^{st}$ register of the register set V2. The SIMD register 17 increments the numbers of the register to store the signal (S230) by one, each time when register set V2 receives the signal (S230). The register set V2 stores the signal (S230) in N registers.

Subsequently, when receiving the signal (S170), the SIMD register 17 outputs data being stored in the $0^{th}$ register of the first register set 171 as a signal (S130), and outputs data being stored in the $0^{th}$ register of the second register set 172 as a signal (S140), as in step (SP1).

The register output unit crossbar 11 also switches the signal (S130) so as to be a signal (VFCRG input S6b), and switches the signal (S140) so as to be a signal (VFCRL input S7b). When receiving the "S6b" and "7b", in other words, when receiving the V0($i$) and V1($i$), the VFCRL operation execution unit 130 executes the VFCRL operation, and outputs a signal (VFCRG output S110) which is to be the V0($i$) (Step SP4). The "S110" may be 64 bits data. The signal (S110) is inputted to the register input unit crossbar 16.

When receiving "S110", the register input unit crossbar 16 switches a destination of the input signals which are to be inputted to the SIMD register 17, and inputs "S110" of the 64 bits data to "S210". The SIMD register 17 stores the input data which is inputted via "S210" in the register of the register set V0. The register number of the register of the register set V0 is the same as the register number of the output data for the VFCRL operation. In other words, the SIMD register 17 stores V0($i$) to the first register set 171 (Step SP5).

Subsequently, the floating-point adder 140 executes an addition arithmetic operation or subtraction arithmetic operation according to the signal (S160).

First, the signal (S130) is inputted to the floating-point adder 140 as the signal (S8), and the signal (S140) is inputted to the floating-point adder 140 as the signal (S9). The floating-point adder 140 adds the data corresponding to the signal (S8), which corresponds to V0($i$), and the data corresponding to the signal (S9), which corresponds to V2($i$). The operation result is sent out from the floating-point adder 140 as a signal (adder output S120) (Step SP6). The "S120" may be 64 bits data.

Then, when the register input unit crossbar 16 receives the signal (S120), the register input unit crossbar 16 outputs the "S120" to "S220". Then, the SIMD register 17 stores the "S220" to the second register set 172 as the V1($i$) (Step SP7).

The signal (S140) is inputted to the floating-point adder 140 as the signal (S8), and the signal (S150) is inputted to the floating-point adder 140 as the signal (S9). The floating-point adder 140 subtracts the data corresponding to the signal (S9), which corresponds to V2($i$), from the data corresponding to the signal (S8), which corresponds to V1($i$). The operation result is sent out from the floating-point adder 140 as the signal (S120) which is to be the V2($i$) (Step SP8).

Then, when the register input unit crossbar 16 receives the signal (S120), the register input unit crossbar 16 outputs the "S120" to "S230" as the 64 bits data. Then, the SIMD register 17 stores the "S230" to the third register set 173 as the V2($i$) (Step SP9).

The signal (S130) is inputted to the floating-point adder 140 as the signal (S8), and the signal (S150) is inputted to the floating-point adder 140 as the signal (S9). The floating-point adder 140 subtracts the data corresponding to the signal (S9), which corresponds to V2($i$), from the data corresponding to the signal (S8), which corresponds to V0($i$). The operation result is sent out from the floating-point adder 140 as the signal (S120) which is to be the V2($i$) (Step SP10). Then, when the register input unit crossbar 16 receives the signal (S120), the register input unit crossbar 16 outputs the "S120" to "S230" as the 64 bits data. Then, the SIMD register 17 stores the "S230" to the third register set 173 as the V2($i$) (Step SP11).

According to the above mentioned operation, the computing error is calculated. The calculated computing error may be stored in the third register set 173 and may be read out when needed.

Figure 9:
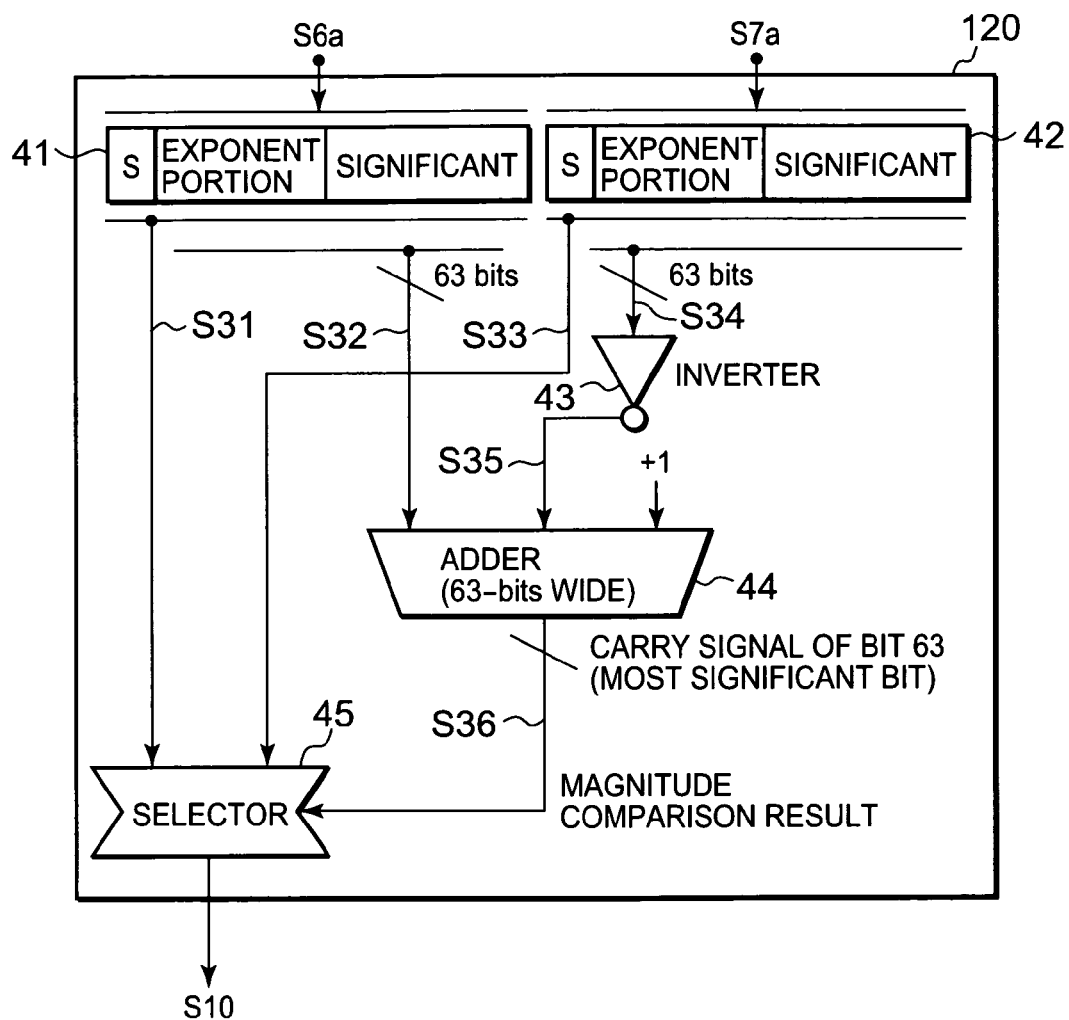
FIG. 9 is an example of a block diagram showing a Vector Floating Compare to Return Greater values (VFCRG) operation execution unit 120 of the present invention.

Next, the VFCRG operation execution unit 120 will be described. FIG. 9 is an example of a block diagram showing the VFCRG operation execution unit 120. The VFCRG operation execution unit 120 includes buffers 41 and 42 to which the signals (S6a and S7a) are inputted respectively, an inverter 43, an adder 44, and a selector 45.

The buffers 41 and 42 store a 64-bit data which includes a sign bit, a exponent portion and a significant.

The inverter 43 inverts a 63-bits data which is inputted to the inverter 43, and outputs the 63-bits data to the adder 44.

The adder 44 is a 63-bits wide adder which receives three inputs. The adder 44 receives two 63-bits data and a signal (+1) which represents a digit carry, and adds two 63-bits data. Since one 63-bits data is inverted by the inverter 43, the adder 44 executes a subtraction operation between the two 63-bits data by executing an addition operation. The adder 44 outputs a carry signal (S36) according to an arithmetic operation result (e.g., additional operation or subtraction operation). The adder 44 may output "0" when the arithmetic operation result is negative, and may output "1" when the arithmetic operation result is positive. The adder 44 may output "0" when the arithmetic operation result is "0".

The selector 45 receives two 64-bits data and the carry signal (S36). The selector 45 selects either one of the two 64-bits data according to the carry signal, and outputs the selected data to "S100".

When receiving the "S6*a*", the VFCRG operation execution unit 120 stores the data corresponding to "S6*a*" in the buffer 41, and outputs the 63-bits data, which is with the exception of the sign bit of the 64-bits data, to the adder 44. When receiving the "S7*a*", the VFCRG operation execution unit 120 stores the data corresponding to "S7*a*" in the buffer 41, and outputs the 63-bits data, which is, with the exception of sign bit, the 64-bits data, to the inverter 43. The inverter 43 also inverts all bits of the 63-bits data (S34), and outputs an inverted 63-bits data (S35) to the adder 44.

The adder 44 receives the 63-bits data (S32) from the buffer 41 and the 63-bits data (S35) from the inverter 43, and adds the 63-bits data (S32) and the 63-bits data (S35). The adder 44 outputs the digit carry signal (S36) according to the arithmetic operation result.

The selector 45 receives a 64-bits data (S32) from the buffer 41, a 64-bits data (S33) from the buffer 42 and the digit carry signal (S36) from the adder 44. When the digit carry signal (S36) represents negative value (i.e., the absolute value of the "6*a*"<the absolute value of the "7*a*"), the selector 45 outputs the 64-bits data (S33) to "S100". Therefore, when the absolute value of the "7*a*" (i.e., V1(*i*)) is larger, the VFCRG operation execution unit 120 selects the V1(*i*) and outputs it to "S100".

When the digit carry signal (S36) represents positive value (i.e., the absolute value of the "6*a*"≧the absolute value of the "7*a*"), the selector 45 outputs the 64-bits data (S31) to "S100". Therefore, when the absolute value of the "6*a*" (i.e., V0(*i*)) is larger, the VFCRG operation execution unit 120 selects the V0(*i*) and outputs it to "S100". When the "6*a*" and "7*a*" are equal (i.e., the V0(*i*) and V1(*i*) are equal), the VFCRG operation execution unit 120 selects the V0(*i*) and outputs it to "S100".

Figure 10:
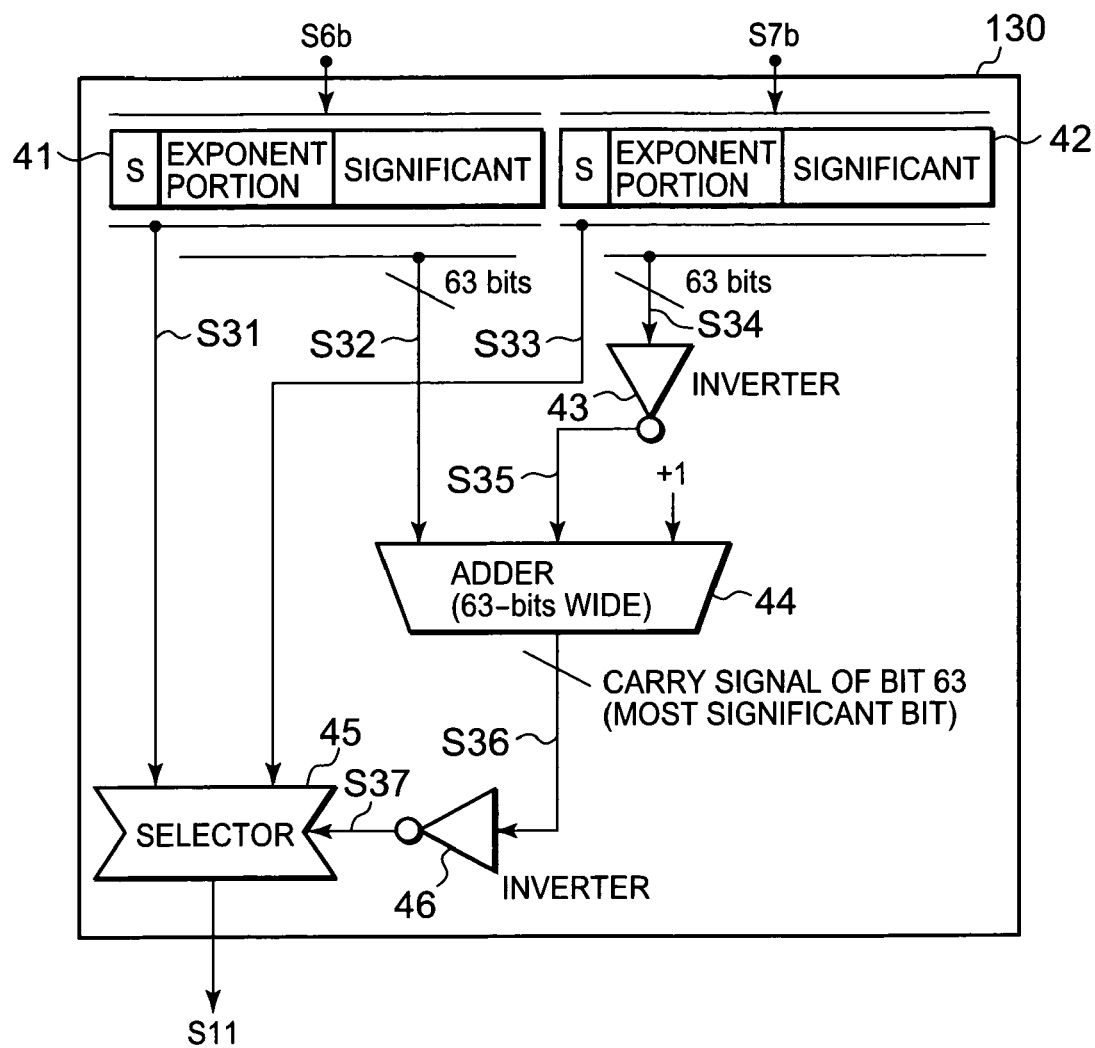
FIG. 10 is an example of a block diagram showing a Vector Floating Compare to Return Less values (VFCRL) operation execution unit 130 of the present invention.

Next, the VFCRL operation execution unit 130 will be described. FIG. 10 is an example of a block diagram showing the VFCRG operation execution unit 120. In FIG. 10, the description regarding elements having the same numerals as the elements shown in FIG. 9, are omitted.

The VFCRG operation execution unit 130 includes an inverter 46.

The inverter 46 inverts the digit carry signal (S36), and outputs it as an inverted digit carry signal (S37) to the selector 45.

When the digit carry signal (S36) represents a negative value (i.e., the absolute value of the "6*b*"<the absolute value of the "7*b*"), the inverter 46 outputs the inverted digit carry signal (S37) as a plus value to the selector 45. When receiving the signal (S37) as the plus value, the selector 45 outputs the 64-bits data (S31) to "S110". Therefore, when the absolute value of the "6*b*" (i.e., V0(*i*)) is smaller, the VFCRL operation execution unit 130 selects the V0(*i*) and outputs it to "S110".

When the digit carry signal (S36) represents a positive value (i.e., the absolute value of the "6*b*"≧the absolute value of the "7*b*"), the inverter 46 outputs the inverted digit carry signal (S37) as a minus value to the selector 45. When receiving the signal (S37) as the minus value, the selector 45 outputs the 64-bits data (S33) to "S110". Therefore, when the absolute value of the "7*b*" (i.e., V1(*i*)) is smaller, the VFCRL operation execution unit 130 selects the V1(*i*) and outputs it to "S110". When the "6*b*" and "7*b*" are equal (i.e., the V0(*i*) and V1(*i*) are equal), the VFCRL operation execution unit 130 selects the V1(*i*) and outputs it to "S110".

Therefore, it is predetermined that the absolute value of "S100"≧the absolute value of "S110". This predetermined result is used for the following arithmetic operation. Therefore, the computing error of the double precision addition may be calculated by the SIMD operation according to Dekker's algorithm more quickly than the related art.

Although the data width of the operated data is 64 bits in the above-described exemplary operations that adopt a double precision-type (binary 64) operation of the IEEE 754 floating-point data format, the operations of the present invention do not depend on that data width. The operations may be executed in other formats such as the short-type (binary 32) format.

Figure 11:
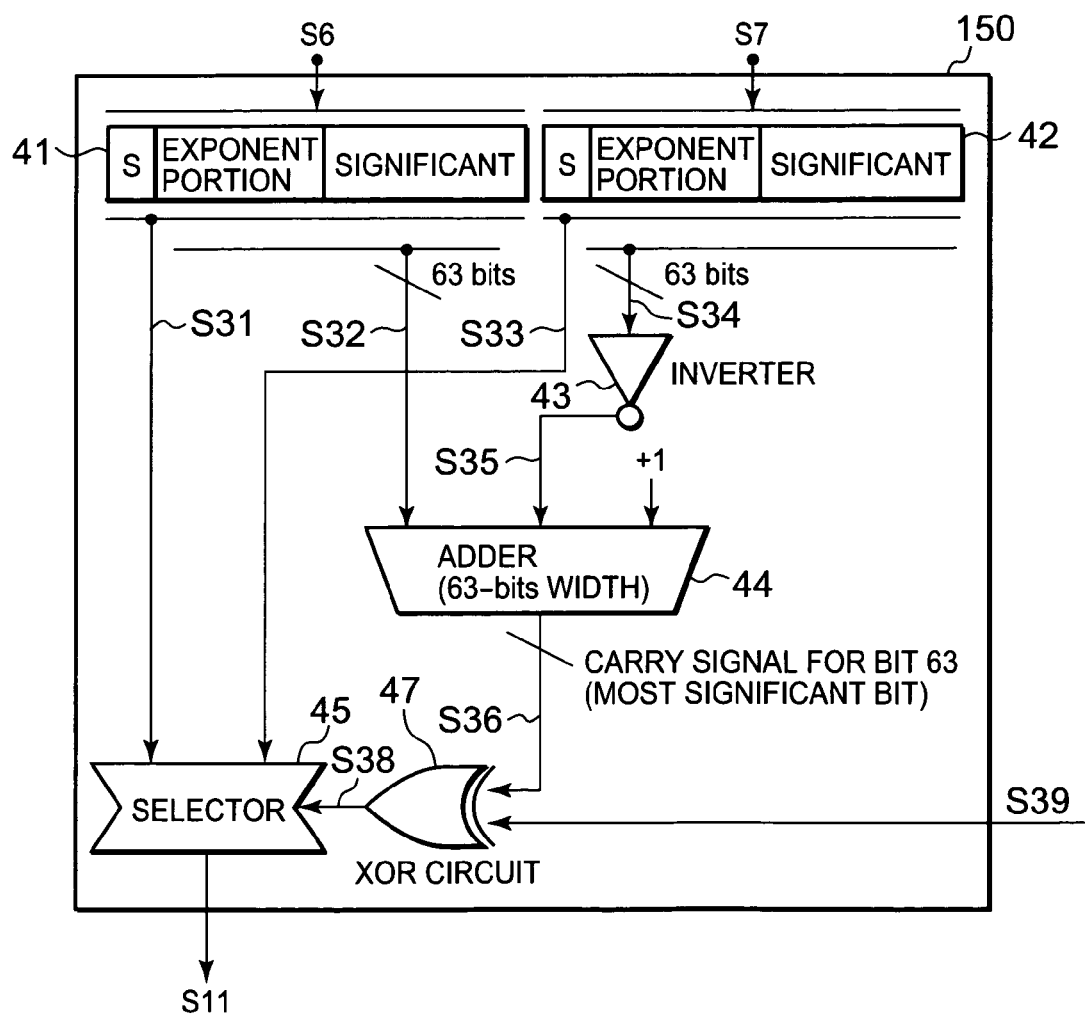
FIG. 11 is an example of a block diagram showing a Vector Floating Compare to Return values (VFCR) operation execution unit 150 of the present invention.

Although the VFCRG operation execution unit 120 and the VFCRL operation execution unit 130 are described separately, the present invention is not limited to this configuration. For example, the VFCRG operation execution unit 120 and the VFCRL operation execution unit 130 may be configured as one operation execution unit, as exemplarily shown in FIG. 11. In FIG. 11, the description regarding elements having the same numerals as the elements shown in FIG. 9 and FIG. 10, are omitted.

As shown in FIG. 11, VFCR operation execution unit 150 includes an exclusive OR (XOR) circuit 47. The XOR circuit 47 executes an XOR operation between the signal (S36) and the signal (S39) being sent from the instruction control unit 30, and outputs a transformed digit carry signal (S38) to the selector 45.

The VFCR operation execution unit 150 compares the absolute values between the V0(*i*) and V1(*i*) being sent from the first and second register sets 171 and 172, respectively. The VFCR operation execution unit 150 outputs either one of the V0(*i*) or V1(*i*) as a larger absolute value data or a smaller absolute value data, respectively, according to the signal (S36).

The XOR circuit 47 outputs either one of the signal (S36) without transformation, or the reversely transformed signal, according to the signal (S39) being sent from the instruction control unit 30. Therefore, the VFCR operation execution unit 150 outputs either one of the V0(*i*) or V1(*i*) according to the transformed signal (S38).

The signal (S39) is included in the signal (S16 or S160) being sent from the instruction control unit 30. The signal (S39) is for instructing that either one of the V0(*i*) or V1(*i*) is to be outputted. When the signal (S39) is "0", the XOR circuit 47 outputs the signal (S38) without transforming the signal (S36). When the signal (S39) is "1", the XOR circuit 47 outputs the signal (S38) with reversely transforming the signal (S36).

With the VFCR operation execution unit 150, the VFCRG operation execution unit 120 and the VFCRL operation execution unit 130 are combined with each other. Therefore, a circuit scale of the operation unit 180 is reduced.

Although the VFCRG operation execution unit 120 and the VFCRL operation execution unit 130 are described separately from the floating-point adder 140, the VFCRG operation execution unit 120 and the VFCRL operation execution unit 130 may be included as a function of the floating-point adder 140 by using the adder of the floating-point adder 140. Alternatively, the VFCRG operation execution unit 120 and the VFCRL operation execution unit 130 may be included as a function of an arithmetic processor that includes a 64-bit adder such as a fixed-point adder and the ALU.

In this embodiment, the VFCRG operation execution unit 120 operates prior to the VFCRL operation execution unit 130. However, the present invention is not limited to this sequence.

As mentioned above, although N pieces of data are processed by one arithmetic processor which includes the SIMD instruction execution unit in the above-described exemplary operations, the number of the arithmetic processor may be incremented to "M". In other words, in the present invention, the number of arithmetic processors is not limited to one arithmetic processor.

Further, as mentioned above, although the present invention is described as a hardware configuration in the above-described embodiments, the present invention is not limited to be implemented by the hardware configuration and may have a part of the processing implemented by a computer program running on a CPU (Central Processing Unit). In that case, the computer program may be distributed on recording media or delivered via transmission media including the Internet.

Further, it is noted that Applicant's intent is to encompass equivalents of all claim elements, even if amended later during prosecution.

What is claimed is:

1. An arithmetic logic unit which processes multiple data by a single instruction (SIMD), comprising:
    a register for SIMD having a first register set and a second register set each including a plurality of registers; and
    an arithmetic unit which executes a process to compare absolute values of two inputs inputted from the first register set and the second register set by an SIMD method, sets a value having a larger absolute value of the two inputs to a first value and sets a value having a smaller absolute value of the two inputs to a second value,
    wherein the arithmetic unit executes addition and subtraction by the SIMD method using the first value and the second value.

2. The arithmetic logic unit according to claim 1, further comprising:
    an input unit for registers which inputs an arithmetic calculation result by the arithmetic unit to the register for SIMD; and
    an instruction control unit which controls the input unit for registers,
    wherein the instruction control unit controls the input unit for registers so as to input the first value to the first register set and to input the second value to the second register set.

3. The arithmetic logic unit according to claim 2, wherein the arithmetic unit includes a comparative arithmetic unit which executes a process to compare the absolute values of two inputs inputted from the first register set and the second register set by the SIMD method, sets the value having the larger one to the first value and sets the value having the smaller one to the second value, and an adding unit which executes addition and subtraction by the SIMD method using the first value and the second value.

4. The arithmetic logic unit according to claim 3, further comprising an output unit for registers which outputs data from the register for SIMD to the arithmetic unit, wherein the register for SIMD includes the first and second register sets and a third register set that stores an arithmetic calculation result of the adding unit, and
    wherein the instruction control unit controls the input unit for registers so that a comparative calculation result of the comparative arithmetic unit is inputted to the first and second register sets and an addition and subtraction result of the adding unit is inputted to the third register set, and controls the output unit for registers so that outputs from the first to third register sets are inputted to one of the comparative arithmetic unit and the adding unit.

5. The arithmetic logic unit according to claim 1, wherein each value stored in the first and second register sets is for executing a floating point calculation defined by IEEE754 standard and includes a sign bit, an index part and a significant part, the arithmetic unit comprising:
    a comparison unit which compares the index part and the significant part except for the sign bit of two inputs inputted from the first and second register sets; and
    a selecting unit which outputs a value having a larger one of absolute values of the index part and the significant part except for the sign bit of two inputs as the first value and outputs a value having a smaller one of the absolute values as the second value based on a comparison result of the comparison unit.

6. The arithmetic logic unit according to claim 1, wherein the adding unit adds the first value and the second value, subtracts the first value from the addition result and subtracts the subtraction result from the second value.

7. The arithmetic logic unit according to claim 1, which calculates a computation error of a double precision addition result.

8. An arithmetic logic unit which processes multiple data by a single instruction (SIMD), comprising:
    a register for SIMD having a first register set and a second register set including a plurality of registers; and
    an arithmetic unit which calculates two input values inputted from the first register set and the second register set based on an SIMD method,
    wherein the arithmetic unit includes:
        a first arithmetic unit which compares absolute values of the two input values and outputs a value having a larger or equal one as a first value;
        a second arithmetic unit which compares the absolute values of the two input values and outputs a value having a smaller or equal one as a second value; and
        a third arithmetic unit which executes addition and subtraction using the first value and the second value.

9. The arithmetic logic unit according to claim 8, further comprising:
    an input unit for registers which inputs arithmetic calculation results by the first and second arithmetic units to the register for SIMD; and
    an instruction control unit which controls the input unit for registers,
    wherein the register for SIMD further includes a third register set including a plurality of registers, and
    wherein the instruction control unit controls the input unit for registers so as to input the first value to the third register set and to input the second value to the first register set.

10. The arithmetic logic unit according to claim 9, further comprising an output unit for registers which outputs data from the register for SIMD to the first to third arithmetic units, wherein the instruction control unit controls the input unit for registers so that an addition and subtraction result of the third arithmetic unit is inputted to the third register set, and controls the output unit for registers so that outputs from the first to third register sets are inputted to any one of the first to third arithmetic units.

11. The arithmetic logic unit according to claim 8, wherein a value stored in the first and second register sets is for executing a floating point calculation defined by IEEE754 standard and includes a sign bit, an index part and a significant part, the arithmetic unit comprising:
a comparison unit which compares the index part and the significant part except for the sign bit of two input values inputted from the first and second register sets; and
a selecting unit which outputs one of the two input values as the first value or the second value based on a comparison result of the comparison unit.

12. The arithmetic logic unit according to claim 11, further comprising:
an input unit for registers which inputs arithmetic calculation results by the first and second arithmetic units to the register for SIMD; and
an instruction control unit which controls the input unit for registers,
wherein the register for SIMD further includes a third register set including a plurality of registers, and
wherein the instruction control unit controls the input unit for registers so as to input the first value to the third register set and to input the second value to the first register set; and
a processing unit which outputs the comparison result of the comparison unit without converting or outputs with converting into an opposite value according to an instruction from the instruction control unit, and
wherein the selecting unit outputs one of the two input values as the first value or the second value based on the comparison result outputted by the processing unit.

13. The arithmetic logic unit according to claim 8, wherein the third arithmetic unit adds the first value and the second value, subtracts the first value from the addition result and subtracts the subtraction result from the second value.

14. The arithmetic logic unit according to claim 8, which calculates a computation error of a double precision addition result.

15. An arithmetic processing apparatus comprising:
a compiler which compiles a program using an addition error;
a storage unit which stores a plurality of instructions from the compiler; and
an arithmetic logic unit which processes multiple data by a single instruction (SIMD) based on an instruction read from the storage unit,
wherein the arithmetic logic unit includes:
a register for SIMD having a first register set and a second register set including a plurality of registers; and
an arithmetic unit which executes a process to compare absolute values of two inputs inputted from the first register set and the second register set by an SIMD method, sets a value having a larger absolute value of the two inputs to a first value and sets a value having a smaller absolute value of the two inputs to a second value,
wherein the arithmetic unit executes addition and subtraction by the SIMD method using the first value and the second value.

16. The arithmetic processing apparatus according to claim 15, further comprising:
an input unit for registers which inputs an arithmetic calculation result by the arithmetic unit to the register for SIMD; and
an instruction control unit which controls the input unit for registers,
wherein the instruction control unit controls the input unit for registers so as to input the first value to the first register set and to input the second value to the second register set.

17. The arithmetic processing apparatus according to claim 15,
wherein the arithmetic unit includes an instruction determining unit,
wherein the instruction determining unit generates a first instruction which compares the absolute values of two inputs and stores the first value having the larger one to the first register set and stores the second value having the smaller one to the second register set, a second instruction which adds the first value and the second value, a third instruction which subtracts the first value from the addition result and a fourth instruction which subtracts the subtraction result from the second value, based on an instruction read from the storage unit, and inputs to the instruction control unit.

18. The arithmetic processing apparatus according to claim 17, wherein the arithmetic unit includes a comparative arithmetic unit which executes a process to compare the absolute values of two inputs inputted from the first register set and the second register set by the SIMD method, sets the value having the larger one to the first value and sets the value having the smaller one to the second value, and an adding unit which executes addition and subtraction by the SIMD method using the first value and the second value.

19. The arithmetic processing apparatus according to claim 18, further comprising an output unit for registers which outputs data from the register for SIMD to the arithmetic unit,
wherein the register for SIMD includes the first and second register sets and a third register set that stores an arithmetic calculation result of the adding unit, and
wherein the instruction control unit controls the input unit for registers so that a comparative calculation result of the comparative arithmetic unit is inputted to the first and second register sets and an addition and subtraction result of the adding unit is inputted to the third register set, and controls the output unit for registers so that outputs from the first to third register sets are inputted to one of the comparative arithmetic unit or the adding unit.

20. The arithmetic processing apparatus according to claim 15, wherein a value stored in the first and second register sets is for executing a floating point calculation defined by IEEE754 standard and includes a sign bit, an index part and a significant part, the arithmetic processing apparatus comprising:
a comparison unit which compares the index part and the significant part except for the sign bit of two inputs inputted from the first and second register sets; and
a selecting unit which outputs a value having a larger absolute value of the two inputs as the first value and outputs a value having a smaller absolute value of the two inputs as the second value based on a comparison result of the comparison unit.

21. The arithmetic processing apparatus according to claim 15, which calculates a computation error of a double precision addition result.

22. An arithmetic processing apparatus comprising:
a compiler which compiles a program using an addition error;
a storage unit which stores a plurality of instructions from the compiler; and
an arithmetic logic unit which processes multiple data by a single instruction (SIMD) based on an instruction read from the storage unit,
wherein the arithmetic logic unit includes:
a register for SIMD having a first register set and a second register set including a plurality of registers; and
an arithmetic unit which calculates two input values inputted from the first register set and the second register set based on an SIMD method,
wherein the arithmetic unit includes:
a first arithmetic unit which compares absolute values of the two input values and outputs a value having a larger or equal one as a first value;
a second arithmetic unit which compares the absolute values of the two input values and outputs a value having a smaller or equal one as a second value; and
a third arithmetic unit which executes addition and subtraction using the first value and the second value.

23. The arithmetic processing apparatus according to claim 22, further comprising:
an input unit for registers which inputs arithmetic calculation results by the first and second arithmetic units to the register for SIMD; and
an instruction control unit which controls the input unit for registers,
wherein the register for SIMD further includes a third register set including a plurality of registers, and
wherein the instruction control unit controls the input unit for registers so as to input the first value to the third register set and to input the second value to the first register set.

24. The arithmetic processing apparatus according to claim 23,
wherein the compiler generates a first instruction by which the absolute values of the two input values are compared and a value having a larger or equal one is stored in the third register set as the first value, a second instruction by which absolute values of the two input values are compared and a value having a smaller or equal one is stored in the first register set as the second value, and a third instruction which makes the arithmetic unit execute an arithmetic calculation using the first value and the second value, and stores in the storage unit, and
wherein the arithmetic unit includes an instruction determination unit, and inputs the first to third instructions read from the storage unit to the instruction control unit.

25. The arithmetic processing apparatus according to claim 23,
wherein the arithmetic unit includes an output unit for registers which outputs data from the register for SIMD to the first to third arithmetic unit, and
wherein the instruction control unit controls the input unit for registers so that an addition and subtraction result of the third arithmetic unit is inputted to the third register set, and controls the output unit for registers so that outputs from the first to third register sets are inputted to any one of the first to third arithmetic units.

26. The arithmetic processing apparatus according to claim 22, wherein a value stored in the first and second register sets is for executing a floating point calculation defined by IEEE754 standard and includes a sign bit, an index part and a significant part, the arithmetic processing apparatus comprising:
a comparison unit which compares the index part and the significant part except for the sign bit of two inputs inputted from the first and second register sets; and
a selecting unit which outputs one of the two input values as the first value or the second value based on a comparison result of the comparison unit.

27. The arithmetic processing apparatus according to claim 26, further comprising:
an input unit for registers which inputs arithmetic calculation results by the first and second arithmetic units to the register for SIMD; and
an instruction control unit which controls the input unit for registers,
wherein the register for SIMD further includes a third register set including a plurality of registers, and
wherein the instruction control unit controls the input unit for registers so as to input the first value to the third register set and to input the second value to the first register set;
wherein the arithmetic unit includes a processing unit which outputs the comparison result of the comparison unit without converting or outputs with converting into an opposite value according to an instruction from the instruction control unit, and
wherein the selecting unit outputs one of the two input values as the first value or the second value based on the comparison result outputted by the processing unit.

28. The arithmetic processing apparatus according to claim 22, which calculates a computation error of a double precision addition result.

29. An arithmetic method of an arithmetic unit which processes multiple data by a single instruction (SIMD), comprising:
comparing absolute values of two inputs from a first register set and a second register set including a plurality of registers, setting a value having a larger absolute value of the two inputs to a first value and setting a value having a smaller absolute value of the two inputs to a second value;
replacing a value of the register so that the first value is stored in the first register set and the second value is stored in the second register set; and
executing arithmetic calculations using the first value and second value stored in the first and second register sets respectively.

30. An arithmetic method of an arithmetic logic unit which processes multiple data by a single instruction (SIMD), comprising:
comparing the absolute values of two inputs from a first register set and a second register set including a plurality of registers, and storing a value having a larger or equal one in a third register set including a plurality of registers as a first value;
comparing the absolute values of two input values from the first register set and the second register set, and storing a value having a smaller equal one in the first register set as a second value; and
executing arithmetic calculations using the first value stored in the third register set and the second value stored in the first register set.

31. The arithmetic method according to claim 30, further comprising:
adding the first value from the third register set and the second value from the first register set, and storing the addition result to the second register set;
subtracting the first value from the third register set from the addition result from the second register set, and storing the subtraction result to the third register set; and
subtracting the subtraction result from the third register set from the second value from the first register set.

32. A compiler which generates instruction sequences for an arithmetic logic unit which processes multiple data by a single instruction (SIMD), comprising:
generating a first instruction by which two data outputted from a first register set and a second register set in a register for SIMD having the first register set and the second register set including a plurality of registers are inputted to an arithmetic unit, absolute values are compared, a first value having a larger absolute value is stored in the first register set and a second value having a smaller absolute value is stored in the second register set; and
generating a second instruction which makes the arithmetic unit execute arithmetic calculations using the first value and the second value.

33. The compiler according to claim 32, further comprising:
generating the second instruction by which the first value from the first register set and the second value from the second register set are inputted to the arithmetic unit and added, and the addition result is inputted to a third register set including a plurality of registers; and
generating a third instruction by which the first value from the first register set is subtracted from the addition result from the third register set and the subtraction result is inputted to the third register set; and generating a fourth instruction by which the subtraction result from the third register set is subtracted from the second value from the second register set.

34. A compiler which generates instruction sequences for an arithmetic logic unit which processes multiple data by a single instruction (SIMD), comprising:
generating a first instruction by which two data outputted from a first register set and a second register set in a register for SIMD having the first register set, the second register set and a third register set including a plurality of registers are inputted to an arithmetic unit, absolute values are compared, and a value having a larger or equal one of the absolute values is stored as a first value in the third register set;
generating a second instruction by which two data outputted from the first register set and the second register set are inputted to the arithmetic unit, the absolute values are compared, and a value having a smaller or equal one of the absolute values is stored as a second value in the first register set; and
generating a third instruction which makes the arithmetic unit execute arithmetic calculations using the first value and the second value.

35. The compiler according to claim 34, further comprising:
generating the third instruction by which the first value from the third register set and the second value from the first register set are inputted to the arithmetic unit and added, and the addition result is stored in the second register set;
generating a fourth instruction by which the first value from the third register set is subtracted from the addition result from the second register set, and the subtraction result is stored in the third register set; and
generating a fifth instruction by which the subtraction result from the third register set is subtracted from the second value from the first register set.

* * * * *